United States Patent
Watanabe et al.

(10) Patent No.: US 8,685,313 B2
(45) Date of Patent: Apr. 1, 2014

(54) CORROSION-RESISTANT MEMBER FOR SEMICONDUCTOR MANUFACTURING APPARATUS AND METHOD FOR MANUFACTURING THE SAME

(71) Applicant: NGK Insulators, Ltd., Nagoya (JP)

(72) Inventors: Morimichi Watanabe, Nagoya (JP); Yuji Katsuda, Tsushima (JP); Toru Hayase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/624,119

(22) Filed: Sep. 21, 2012

(65) Prior Publication Data
US 2013/0022526 A1 Jan. 24, 2013

Related U.S. Application Data

(63) Continuation of application No. PCT/JP2011/056623, filed on Mar. 18, 2011.

(30) Foreign Application Priority Data

Mar. 30, 2010 (JP) ................................. 2010-079250

(51) Int. Cl.
*C04B 35/00* (2006.01)
(52) U.S. Cl.
USPC ............ 264/681; 264/109; 423/263; 118/728
(58) Field of Classification Search
USPC .......... 423/263, 21.1; 501/123, 152; 264/109, 264/681; 438/758; 118/728
See application file for complete search history.

(56) References Cited

U.S. PATENT DOCUMENTS

| | | | |
|---|---|---|---|
| 2002/0032118 A1* | 3/2002 | Oshio | 501/120 |
| 2007/0151481 A1* | 7/2007 | Akiyama et al. | 106/286.2 |
| 2007/0218302 A1 | 9/2007 | Kobayashi et al. | |
| 2008/0207432 A1 | 8/2008 | Hamada | |
| 2009/0016409 A1* | 1/2009 | Mizoguchi et al. | 374/185 |
| 2009/0026920 A1* | 1/2009 | Shimomura et al. | 313/504 |

FOREIGN PATENT DOCUMENTS

| | | |
|---|---|---|
| JP | 10-004083 A1 | 1/1998 |
| JP | 10-045461 A1 | 2/1998 |
| JP | 10-045467 A1 | 2/1998 |
| JP | 10-053462 A1 | 2/1998 |
| JP | 2939535 B2 | 8/1999 |
| JP | 2002-222803 A1 | 8/2002 |
| JP | 2002-362966 A1 | 12/2002 |
| JP | 2006-100705 A1 | 4/2006 |
| WO | 2005/009919 A1 | 2/2005 |
| WO | 2007/108546 A1 | 9/2007 |

OTHER PUBLICATIONS

Partial translation of Japan 10-045461, Feb. 17, 1998.*
International Search Report and Written Opinion dated May 17, 2011 (with English translation).

* cited by examiner

*Primary Examiner* — Steven Bos
(74) *Attorney, Agent, or Firm* — Burr & Brown, PLLC

(57) ABSTRACT

A mixed powder was prepared by weighing $Yb_2O_3$ and $SrCO_3$ in such a way that the molar ratio became 1:1. The resulting mixed powder was subjected to uniaxial pressure forming, so as to produce a disc-shaped compact. The compact was heat-treated in an air atmosphere, so that a complex oxide was synthesized. The resulting complex oxide was pulverized. After the pulverization, a slurry was taken out and was dried in a nitrogen gas stream, so as to produce a synthesized powder material. The resulting synthesized powder material was subjected to uniaxial pressure forming, so as to produce a disc-shaped compact. The resulting compact was fired by a hot-press method, so as to obtain a corrosion-resistant member for semiconductor manufacturing apparatus. The resulting corrosion-resistant member was made from a $SrYb_2O_4$.

8 Claims, No Drawings

CORROSION-RESISTANT MEMBER FOR SEMICONDUCTOR MANUFACTURING APPARATUS AND METHOD FOR MANUFACTURING THE SAME

FIELD OF THE INVENTION

The present invention relates to a corrosion-resistant member for semiconductor manufacturing apparatus and a method for manufacturing the same.

BACKGROUND OF THE INVENTION

In a semiconductor manufacturing apparatus used for performing a dry process, plasma coating, or the like in production of a semiconductor, a highly reactive F or Cl based plasma is used for etching or cleaning. Therefore, a member used for such an apparatus necessarily has high corrosion resistance, and a member, e.g., an electrostatic chuck or a heater, which comes into contact with a Si wafer is required to have still higher corrosion resistance. Patent Document 1 discloses $Yb_2O_3$ and $Dy_2O_3$ thin films formed by a PVD method as corrosion-resistant members capable of responding to such a demand. The etching rates of these thin films are very small as compared with the etching rates of an alumina sintered body and the like.

CITATION LIST

Patent Document
Patent Document 1: Japanese Unexamined Patent Application Publication No. 2002-222803

SUMMARY OF THE INVENTION

However, when the thin film undergoes plasma cleaning, it is easily etched due to pores and cracks created during film formation. In addition, the thin film may influence device characteristics due to peeling and the like, along with proceeding in corrosion and repeated use on the basis of differences in properties between the thin film and a base material and an adhesion problem. Consequently, application to an electrostatic chuck and the like has problems. Sintered bodies are suitable for these members. However, in Patent Document 1 described above, $Yb_2O_3$ and $Dy_2O_3$ thin films formed by the PVD method are evaluated, although a sintered body is not evaluated. Sintered bodies of $Y_2O_3$ and $Al_2O_3$ are known as corrosion-resistant members, but development of sintered body materials capable of further reducing the etching rates have been desired.

The present invention has been made to solve the above-described problems and it is a main object to provide a sintered body serving as a corrosion-resistant member for semiconductor manufacturing apparatus, exhibiting a reduced etching rate smaller than the etching rates of conventional sintered bodies.

The present inventors noted that yttria and other rare-earth oxides have high corrosion resistance and made a search for rare-earth compounds having still higher corrosion resistance. As a result, it was found that complex oxides of group 2 metals (excluding Mg) and rare-earth elements (excluding La) exhibited very high corrosion resistance, and the present invention has been made.

That is, a corrosion-resistant member for semiconductor manufacturing apparatus according to the present invention has a main phase made from a complex oxide of a group 2 element (excluding Mg) and a group 3 element (excluding La).

Furthermore, a method for manufacturing a corrosion-resistant member for semiconductor manufacturing apparatus, according to the present invention, includes the steps of forming a powder containing a group 2 element (excluding Mg) and a group 3 element (excluding La) into the shape of a desired corrosion-resistant member for semiconductor manufacturing apparatus and hot-press firing the resulting compact, so as to obtain the corrosion-resistant member having a main phase made from a complex oxide of the above-described group 2 element and the above-described group 3 element.

According to the corrosion-resistant member for semiconductor manufacturing apparatus of the present invention, the reduced etching rate smaller than the etching rates of conventional yttria sintered body and alumina sintered body can be exhibited. Therefore, the amount of particles generated from the corrosion-resistant member is reduced, and it is possible to endure highly reactive F or Cl based plasma used in a semiconductor production process for a long period. Meanwhile, the method for manufacturing a corrosion-resistant member for semiconductor manufacturing apparatus according to the present invention is suitable for production of such a corrosion-resistant member.

DETAILED DESCRIPTION OF THE INVENTION

A corrosion-resistant member for semiconductor manufacturing apparatus of the present invention includes a crystal phase of a complex oxide of a group 2 element (excluding Mg) and a group 3 element (excluding La).

In the corrosion-resistant member for semiconductor manufacturing apparatus according to the present invention, the crystal phase of the above-described complex oxide may be a main phase. Meanwhile, the group 2 element in the complex oxide is preferably Ca or Sr from the viewpoint of ease of production of the complex oxide, and Sr is particularly preferable. In addition, the group 3 element of the complex oxide is preferably Y, Yb, Ho, Dy, or Er from the viewpoint of corrosion resistance and case of production of the complex oxide. In this regard, a complex oxide of Mg and the group 3 element and a complex oxide of a group 2 element and La are not known up to now.

In the corrosion-resistant member for semiconductor manufacturing apparatus according to the present invention, a crystal phase of an oxide of a group 3 element may be present separately from the above-described complex oxide. Such an oxide of a group 3 element has not only high corrosion resistance, but also an effect of suppressing grain growth of the above-described complex oxide. Therefore, the bending strength of the resulting corrosion-resistant member is improved. Preferably, such an oxide of a group 3 element is specified to be at least one type selected from the group consisting of ytterbium oxide, holmium oxide, yttrium oxide, erbium oxide, and dysprosium oxide.

Preferably, the open porosity of the corrosion-resistant member for semiconductor manufacturing apparatus according to the present invention is 0.1% or less. The open porosity is specified to be a value measured by anthe Archimedes method, where the medium is specified to be pure water.Open porosity exceeding 0.1% is not preferable because the etching rate may increase and the bending strength may be reduced. Preferably, the open porosity is as close to zero as possible. Consequently, a lower limit value is not particularly specified.

The method for manufacturing a corrosion-resistant member for semiconductor manufacturing apparatus, according to the present invention, includes the steps of forming a powder containing a group 2 element (excluding Mg) and a group 3 element (excluding La) into the shape of a desired corrosion-resistant member for semiconductor manufacturing apparatus and hot-press firing the resulting compact, so as to obtain the corrosion-resistant member having a main phase made from a complex oxide of the above-described group 2 element and the above-described group 3 element. This manufacturing method is suitable to obtain the corrosion-resistant member for semiconductor manufacturing apparatus according to the present invention.

In this manufacturing method, the above-described powder may contain the group 3 element (excluding La) in the amount more than a stoichiometric quantity required for producing the complex oxide through reaction with the group 2 element (excluding Mg). Consequently, the corrosion-resistant member containing a crystal phase of the complex oxide and further containing a crystal phase of an oxide of a group 3 element is obtained.

Here, the hot-press firing is preferably performed in an inert atmosphere. An atmosphere which does not exert an influence on firing of the oxide raw material is good enough for the inert atmosphere. For example, a nitrogen atmosphere, an argon atmosphere, a helium atmosphere, and the like are mentioned. In this regard, the firing temperature and the press pressure during the hot press may be set appropriately in accordance with the type of the raw material insofar as the temperature and the pressure are suitable to obtain a dense sintered body. For example, the firing temperature may be set between 1,500° C. and 1,800° C. and the press pressure may be set between 100 and 300 kgf/cm2. The pressure during forming is not specifically limited and may be set at an appropriate pressure at which the shape group 2 elementgroup 3 element can be maintained. Furthermore, a sintering aid may be added to the powder containing the group 2 element (excluding Mg) and the group 3 element (excluding La), forming into a predetermined shape, and the resulting compact may be subjected to hot-press firing. At that time, the firing temperature can be lowered as compared with that in the case where the sintering aid is not used and, thereby, the production cost is reduced. However, a sintering aid which affects the corrosion resistance is not preferable. For example, a fluoride of at least one type of element selected from the group consisting of Mg, Ca, and Sr has high corrosion resistance and is favorable.

EXAMPLES

Favorable examples of the present invention will be described below. Commercially available powders having purities of 99.9% or more and average particle diameters of 11 μm or less were used as $Yb_2O_3$, $Ho_2O_3$, and $Y_2O_3$ raw materials. A commercially available powder having a purity of 99.9% or more and an average particle diameter of 1 μm or less was used as $SrCO_3$ raw material. A commercially available powder having a purity of 99.5% or more and an average particle diameter of 0.5 μm was used as an $Al_2O_3$ raw material.

Examples 1 to 8

Initially, a synthesized powder material was prepared. That is, a rare-earth oxide and strontium carbonate shown in Table 1 were weighed in such a way that the molar ratio shown in Table 1 was ensured, and were wet-mixed for 4 hours, where isopropyl alcohol was employed as a solvent, and a nylon pot and balls having a diameter of 10 mm were used. After mixing, a slurry was taken out and was dried in a nitrogen gas stream at 110° C. Subsequently, a mixed powder was produced by being passed through a 30 mesh sieve. Then, the resulting mixed powder was subjected to uniaxial pressure forming at a pressure of 120 kgf/cm², so that a disc-shaped compact having a diameter of about 50 mm and a thickness of about 20 mm was produced. The compact was heat-treated in an air atmosphere at 1,000° C. to 1,200° C. for 12 hours, so that a $CO_2$ component was removed and a complex oxide was synthesized. The resulting complex oxide was roughly pulverized with a mortar and was wet-pulverized to an average particle diameter of 1 μm or less, as necessary. In the wet pulverization, a solvent was specified to be isopropyl alcohol and pulverization was performed by a common pot mill. After the pulverization, a slurry taken out was dried in a nitrogen gas stream at 110° C. and was passed through a 30 mesh sieve, so as to produce a synthesized powder material.

Next, the synthesized powder was formed into a predetermined shape. That is, the synthesized powder was subjected to uniaxial pressure forming at a pressure of 200 kgf/cm², so as to produce a disc-shaped compact having a diameter of about 50 mm and a thickness of about 10 mm.

Finally, the resulting compact was fired, so as to obtain a corrosion-resistant member for semiconductor manufacturing apparatus. That is, disc-shaped compact was placed into a graphite mold for firing and was fired at a predetermined firing temperature. Firing was performed by using a hot-press method. The press pressure was specified to be 200 kgf/cm2 and an Ar atmosphere was kept until the firing was finished. The retention time at the firing temperature (maximum temperature) was specified to be 4 hours.

Comparative Examples 1 and 2

Forming and firing were performed by using an $Al_2O_3$ powder in Comparative example 1 or an $Y_2O_3$ in Comparative example 2 in place of the synthesized powders in Examples 1 to 8. In this regard, in Comparative example 1, the firing temperature was specified to be 1,700° C., and in Comparative example 2, the firing temperature was specified to be 1,500° C.

[Evaluation Method]

Each of the resulting sintered bodies was worked for various evaluations, and the following evaluations were performed. Each evaluation result is as shown in Table 1.

(1) Open Porosity and Bulk Density

The measurement was performed by an Archimedes method, where the medium was specified to be pure water. A sample having a shape worked into 3 mm×4 mm×40 mm was used.

(2) Evaluation of Crystal Phase

A sintered body was pulverized with a mortar, and a crystal phase was identified with an X-ray diffractometer. The measurement conditions were specified to be CuKcx, 40 kV, 40 mA, and 2θ=10°-70°, and a sealed tube type X-ray diffractometer (D8 ADVANCE produced by Bruker AXS K.K.) was used.

(3) Etching Rate

The surface of each sintered body was mirror-finished, and a corrosion resistance test was performed by using an ICP plasma corrosion resistance test apparatus under the following condition. The etching rate of each material was calculated by dividing a height difference between an unexposed surface and an exposed surface, measured with a surface roughness meter, by a test time.

ICP: 800 W, bias: 450 W, gas flow: $NF_3/O_2/Ar=75/35/100$ sccm 0.05 Torr, exposure time: 10 h, sample temperature: room temperature (4) Strength The strength was calculated by performing a four-point bending test on the basis of JIS 81601.

(5) Volume Resistivity

The measurement was performed in the air at room temperature by a method on the basis of JIS C2141. The shape of the test piece was specified to have a diameter of 50 mm and a thickness of 1 mm, and the individual electrodes were formed from silver in such a way that a main electrode had a diameter of 20 mm, a guard electrode had an inside diameter of 30 mm, the guard electrode had an outside diameter of 40 mm, and an application electrode had a diameter of 40 mm. An applied voltage was specified to be 500 V/mm, a current was read one minute after voltage application, and the volume resistivity was calculated.

is because $Yb_2O_3$ was present and, thereby, the grain size of sintered body became small. In this regard, it is well known that if the grain size of sintered body becomes small, the strength increases. Furthermore, the volume resistivity of the corrosion-resistant member in Example 3 was higher than that in Example 1. It is believed that this is because $Yb_2O_3$ having a higher volume resistivity than $SrYb_2O_4$ was present.

In Example 4, a complex oxide of $SrHo_2O_4$ was synthesized by reacting $Ho_2O_3$ and $SrCO_3$ at a molar ratio of 50:50. In Example 5, a composite oxide containing $SrHo_2O_4$ and $Ho_2O_3$ at a molar ratio of 82:18 was synthesized by reacting $Ho_2O_3$ and $SrCO_3$ at a molar ratio of 55:45. These oxides were subjected to forming and firing in the above-described procedure. The resulting corrosion-resistant members for semiconductor manufacturing apparatus had etching rates lower than that in Comparative examples 1 and 2. Therefore, it is clear that the corrosion resistance is excellent as compared with that in Comparative examples 1 and 2. Meanwhile,

TABLE 1

| | Raw material | Firing temperature (° C.) | Bulk density (g/cm³) | Open porosity (%) | Crystal phase | $NF_3$ Etching rate (nm/h) | Strength (MPa) | Volume resistivity (Ω · cm) |
|---|---|---|---|---|---|---|---|---|
| Example 1 | 50 mol % $Yb_2O_3$ 50 mol % $SrCO_3$ | 1600 | 8.35 | 0.1 | $SrYb_2O_4$ | 205 | 152 | 2.4E+12 |
| Example 2 | 55 mol % $Yb_2O_3$ 45 mol % $SrCO_3$ | 1600 | 8.49 | 0.1 | $SrYb_2O_4$ $Yb_2O_3$ | 209 | 210 | — |
| Example 3 | 67 mol % $Yb_2O_3$ 33 mol % $SrCO_3$ | 1600 | 8.78 | 0.1 | $SrYb_2O_4$ $Yb_2O_3$ | 215 | 215 | 4.8E+14 |
| Example 4 | 50 mol % $Ho_2O_3$ 50 mol % $SrCO_3$ | 1600 | 7.79 | 0.1 | $SrHo_2O_4$ | 229 | 75 | 6.5E+15 |
| Example 5 | 55 mol % $Ho_2O_3$ 45 mol % $SrCO_3$ | 1600 | 7.89 | 0.1 | $SrHo_2O_4$ $Ho_2O_3$ | 233 | 120 | 6.3E+15 |
| Example 6 | 50 mol % $Y_2O_3$ 50 mol % $SrCO_3$ | 1600 | 5.33 | 0.1 | $SrY_2O_4$ | 257 | 82 | 3.7E+15 |
| Example 7 | 50 mol % $Er_2O_3$ 50 mol % $SrCO_3$ | 1600 | 7.93 | 0.1 | $SrEr_2O_4$ | 225 | 195 | — |
| Example 8 | 50 mol % $Dy_2O_3$ 50 mol % $SrCO_3$ | 1600 | 7.58 | 0.1 | $SrDy_2O_4$ | 231 | 160 | — |
| Comparative example 1 | $Al_2O_3$ | 1700 | 3.98 | <0.1 | $Al_2O_3$ | 623 | 350 | 5.5E+16 |
| Comparative example 2 | $Y_2O_3$ | 1500 | 8.35 | 0.1 | $Y_2O_3$ | 280 | 150 | 2.3E+16 |

[Evaluation results]

As shown in Table 1, in Example 1, a complex oxide of $SrYb_2O_4$ was synthesized by reacting $Yb_2O_3$ and $SrCO_3$ raw materials at a molar ratio of 50:50, and was subjected to forming and firing in the above-described procedure, so as to obtain a corrosion-resistant member for semiconductor manufacturing apparatus. This corrosion-resistant member includes a $SrYb_2O_4$ crystal phase as a main phase, and it is clear that the corrosion resistance is excellent as compared with that in Comparative examples 1 and 2 because the etching rate was lower than that in Comparative examples 1 and 2.

In Example 2, a composite oxide containing $SrYb_2O_4$ and $Yb_2O_3$ at a molar ratio of 82:18 was synthesized by reacting $Yb_2O_3$ and $SrCO_3$ at a molar ratio of 55:45. In Example 3, a composite oxide containing $SrYb_2O_4$ and $Yb_2O_3$ at a molar ratio of 1:1 was synthesized by reacting $Yb_2O_3$ and $SrCO_3$ at a molar ratio of 67:33. These were subjected to forming and firing in the above-described procedure. The resulting corrosion-resistant member includes both the $SrYb_2O_4$ crystal phase and the $Yb_2O_3$ crystal phase, and it is clear that the corrosion resistance is excellent as compared with that in Comparative examples 1 and 2 because the etching rate was lower than that in Comparative examples 1 and 2. Meanwhile, the corrosion-resistant members Examples 2 and 3 exhibited strength higher than that in Example 1. It is believed that this the corrosion-resistant members in Examples 4 and 5 exhibited bending strength lower than that in Example 1, but the volume resistivities were higher. In this regard, the corrosion-resistant member in Example 5 exhibited higher strength than that in Example 4. It is believed that this is because $Ho_2O_3$ was present in Example 5 and, thereby, the grain size of sintered body became smaller than that in Example 4.

In Example 6, a complex oxide of $SrY_2O_4$ was synthesized by reacting $Y_2O_3$ and $SrCO_3$ at a molar ratio of 50:50. The etching rate of a corrosion-resistant member for semiconductor manufacturing apparatus obtained by subjecting the resulting oxide raw material to forming and firing in the above-described procedure was lower than that in Comparative examples 1 and 2. Therefore, it is clear that the corrosion resistance is excellent as compared with that in Comparative examples 1 and 2.

In Example 7, a complex oxide of $SrEr_2O_4$ was synthesized by reacting $Er_2O_3$ and $SrCO_3$ at a molar ratio of 50:50. The etching rate of a corrosion-resistant member for semiconductor manufacturing apparatus obtained by subjecting the resulting oxide raw material to forming and firing in the above-described procedure was lower than that in Comparative examples 1 and 2. Therefore, it is clear that the corrosion resistance is excellent as compared with that in Comparative examples 1 and 2.

In Example 8, a complex oxide of $SrDy_2O_4$ was synthesized by reacting $Dy_2O_3$ and $SrCO_3$ at a molar ratio of 50:50. The etching rate of a corrosion-resistant member for semiconductor manufacturing apparatus obtained by subjecting the resulting oxide raw material to forming and firing in the above-described procedure was lower than that in Comparative examples 1 and 2. Therefore, it is clear that the corrosion resistance is excellent as compared with that in Comparative examples 1 and 2.

When Examples 1, 4, and 6 to 8 are compared, the order of the corrosion resistance of the rare-earth oxides was $SrYb_2O_4 > SrEr_2O_4 > SrHo_2O_4 > SrDy_2O_4 > SrY_2O_4$. That is, the corrosion resistance was better as the atomic weight of the rare-earth element increased. Meanwhile, it was determined that the corrosion resistance of the complex oxide according to the present invention was higher than that of $Y_2O_3$ from comparisons between $Y_2O_3$ in Comparative example 2 and $SrY_2O_4$ in Example 6.

The present application claims priority from Japanese Patent Application No. 2010-079250 filed on Mar. 30, 2010, the entire contents of which are incorporated in the present specification by reference.

INDUSTRIAL APPLICABILITY

The present invention can be applied to a semiconductor manufacturing apparatus utilized for performing a dry process, plasma coating, or the like in production of a semiconductor.

The invention claimed is:

1. A corrosion-resistant member for semiconductor manufacturing apparatus containing a crystal phase of a complex oxide of a group 2 element, excluding Mg, and a group 3 element, excluding La, wherein the group 2 element in the complex oxide is Sr, and the group 3 element of the complex oxide is one element selected from the group consisting of Y, Yb, Ho. Er and Dv, and the corrosion-resistant member is resistant to corrosion by reactive plasma used for etching or cleaning in a semiconductor processing apparatus.

2. The corrosion-resistant member for semiconductor manufacturing apparatus according to claim 1, wherein the crystal phase of the complex oxide is a main phase.

3. The corrosion-resistant member for semiconductor manufacturing apparatus according to claim 1, wherein a second crystal phase of an oxide of a group 3 element is present in the member separately from the crystal phase of the complex oxide.

4. The corrosion-resistant member for semiconductor manufacturing apparatus according to claim 3, wherein the oxide of the group 3 element in the second crystal phase is at least one oxide selected from the group consisting of ytterbium oxide, holmium oxide, yttrium oxide, erbium oxide, and dysprosium oxide.

5. The corrosion-resistant member for semiconductor manufacturing apparatus according to claim 2, wherein the open porosity of the member is 0.1% or less.

6. The corrosion-resistant member for semiconductor manufacturing apparatus according to claim 3, wherein the open porosity of the member is 0.1% or less.

7. A method for manufacturing a corrosion-resistant member for semiconductor manufacturing apparatus, comprising the steps of forming a powder containing a group 2 element, excluding Mg, and a group 3 clement, excluding La, into the shape of a corrosion-resistant member for semiconductor manufacturing apparatus and hot-press firing the shaped member, so as to obtain the corrosion-resistant member having a crystal phase of a complex oxide of the group 2 element and the group 3 clement, wherein the group 2 element in the complex oxide is Sr. and the group 3 clement of the complex oxide is one element selected from the group consisting of Y, Yb, Ho, Er and Dy, and the corrosion-resistant member is resistant to corrosion by reactive plasma used for etching or cleaning in a semiconductor processing, apparatus.

8. The method for manufacturing a corrosion-resistant member for semiconductor manufacturing apparatus according to claim 7, wherein the powder contains the group 3 element, excluding La, in the amount more than a stoichiometric quantity required for producing the complex oxide through reaction with the group 2 element, excluding Mg.

* * * * *